Jan. 22, 1957 C. O. BROWN 2,778,265
SOLID CUP-POINT SET SCREW
Filed June 15, 1953 2 Sheets-Sheet 2
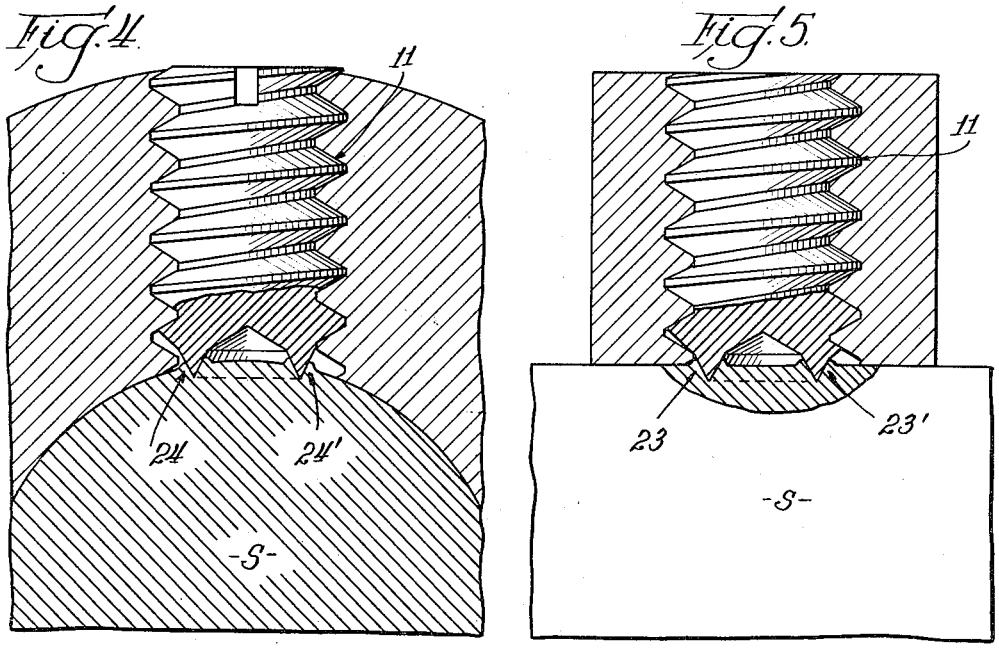
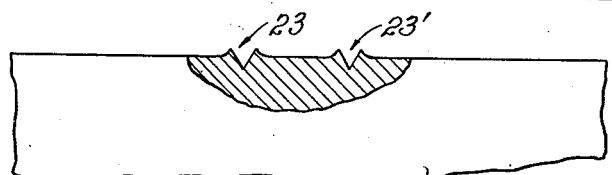
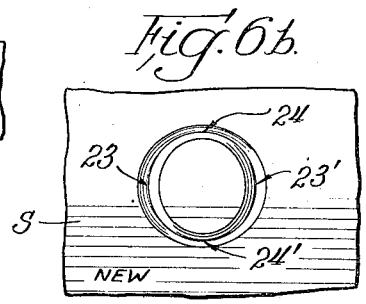
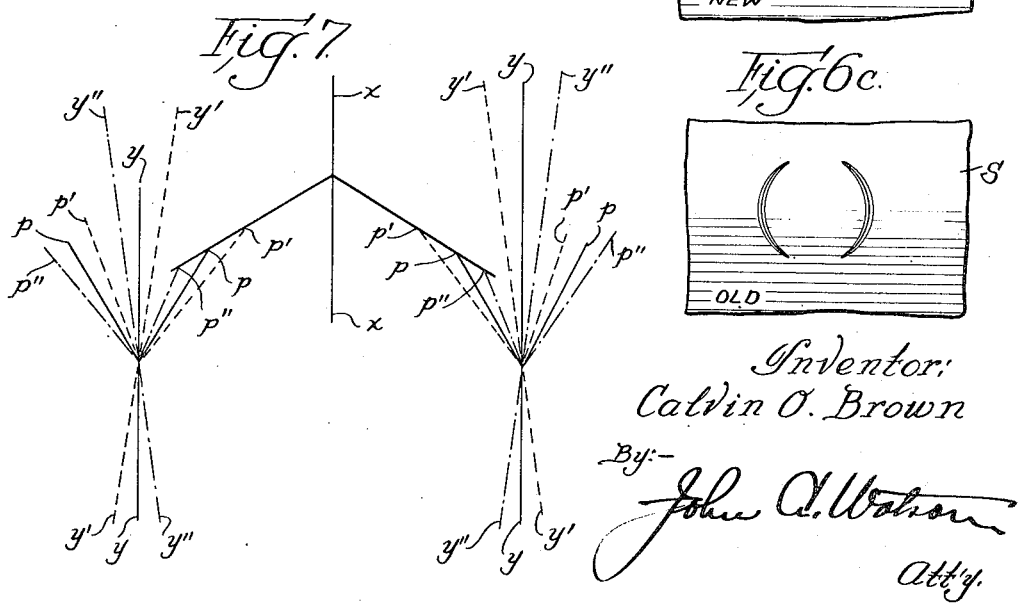
Inventor:
Calvin O. Brown
By:-
John A. Watson
Att'y.

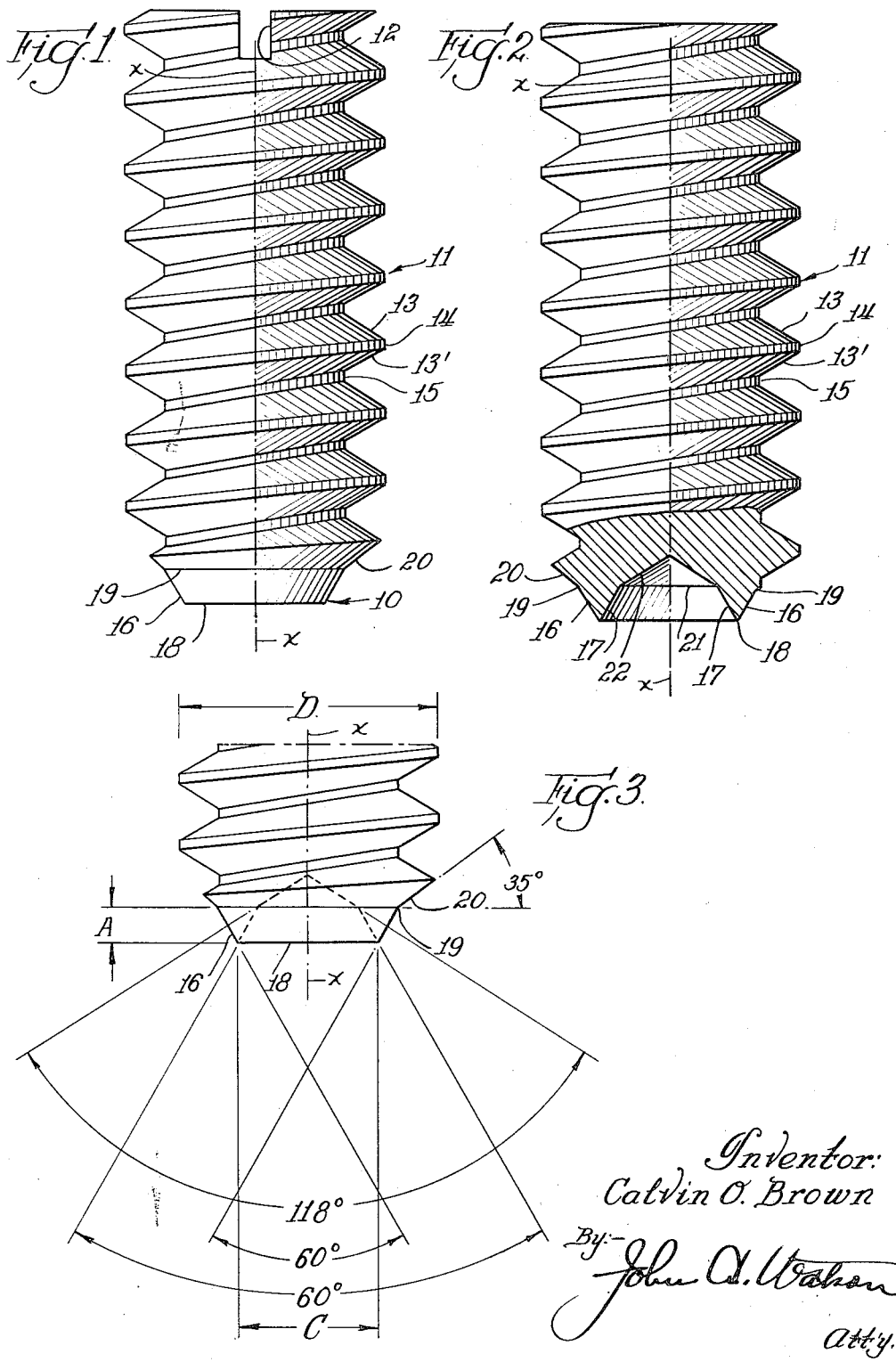

United States Patent Office 2,778,265
Patented Jan. 22, 1957

2,778,265

SOLID CUP-POINT SET SCREW

Calvin O. Brown, Cary, Ill., assignor, by mesne assignments, to Set Screw & Mfg. Company, Bartlett, Ill., a corporation of Illinois Application June 15, 1953, Serial No. 361,537

2 Claims. (Cl. 85—1)

The invention pertains to set screws of the cup-point type and, in greater particularity, to improvements in the shape or form of the cup-point and its relative dimensions.

Cup-point set screws find many useful applications. For example, they are employed in fastening two or more elements against relative movement as where holding wheels or knobs, collars, pulleys and the like on cylindrical shafting and against both longitudinal and rotational movements relative thereto. While cone-point and other types of set screw may be used in manners and for purposes similar to those for which cup-point set screws may be employed, there are many instances where cup-point set screws are required or are to be preferred for one or another reason. However, in those cases as where a standard cup-point set screw is employed to secure a cylindrical shaft and a collar or other element thereon against relative rotation or relative movement axially of the shaft, the ordinary cup-point set screw, while it may be superior to other types, may offer insufficient resistance to torque and other stresses developing between the shaft and the member secured thereon, to prevent relative rotation or other movement between the shaft and such member.

As is well known, the cup-point of the normal or standard cup-point set screw is an annulus concentric with the screw or thread axis and triangular in radial section with its opposed flanks including an angle of susbtantially 105°, the inner flank of the section making an angle of about 60° with respect to the thread axis and the outer flank making an angle of about 45° with such axis. The inner flank across a diameter, therefore, will include an angle of 120° and the outer flank across such diameter will include an angle of 90°. Usually such set screws and their construction details will conform to specification standards for such set screws as are set by National Bureau of Standards Handbook H–28 (1944) entitled Screw-Thead Standards for Federal Services, 1944 (superceding Handbook H–28 (1944)), issued February 17, 1945, and printed by the United States Government Printing Office, Washington, D. C.; see pages 212–216 in particular. Such standard cup-points are quite blunt and shallow so that they can not penetrate to a very substantial depth into the shaft or other member against which they are to be set and what penetration is secured, when set against the cylindrical surface of a shaft, at most is in the form of two crescents spaced longitudinally of the cylindrical surface of the shaft. Some cup-points with flanks extending from one another at an angle of 90° or approximately 90° have been utilized but they have been about as unsatisfactory as those with a flank angle of 105°. Obviously the penetrating and holding power of any such cup-points can not be great.

Accordingly it is a primary object of the invention to provide a cup-point set screw of such construction and conformation, so far as the cup-point itself is concerned, that the cup-point will not only readily penetrate an element such as a shaft against which it is set, but the penetration will be deeper and of greater circumferential degree up to and including the entire circumference of the point, thereby tremendously to increase the resistance offered to movement of one part relative to the other under load.

Another important object is to provide a set screw that not only will have greater holding power than other known set screws of similar type but will also have greater resistance to vibratory and other forces tending to unseat it or to loosen it.

Many other objects as well as the advantages and uses of the invention will be or should become apparent after reading the following description and claims and after viewing the drawings, in which:

Fig. 1 is a side elevational view on a large scale, showing a headless, slotted set screw having a thread of United States standard —60°— flat crest type and a cup-point construction after the teaching of the invention thereof;

Fig. 2 is a view of the screw of Fig. 1 on the same scale, showing the cup-point end in section;

Fig. 3 is a fragmentary view of the cup-point end of the set screw of Fig 1, with dimension and angle lines applied to indicate the preferred form and dimensions of the cup-point shown in Figs. 1 and 2;

Figs. 4 and 5 are sectional views through a combined shaft collar and shaft showing the application of the preferred form of cup-point set screw of the invention in place and holding the shaft collar and shaft together, Fig. 4 being a view in section normal to the shaft axis and Fig. 5 being a view longitudinal of the shaft axis;

Figs. 6a and 6b, respectively, are views illustrating the appearance of a cylindrical surface of a cylindrical shaft after distortion by impressing the cup end of a cup-point set screw of the type of the invention into the shaft;

Fig. 6c is a view similar to that of Fig. 6b illustrating the crescent shaped distortion grooves that normally may be formed in a cylindrical shaft surface by the usual or standard form of cup-point set screw; and Fig. 7 is a diagrammatic view illustrating certain of a number of cup-point profile variations that may be effected.

The cup-point 10 of the preferred form of the invention is illustrated in Figs. 1 to 5, inclusive, as applied to a conventionalized headless set-screw 11 the driving end of which has a screwdriver slot 12. The set screw has an American National or U. S. standard thread the flanks 13, 13' of which are disposed at a 60° angle to one another and the crest 14 and root 15 of which are flat, but, as will be apparent to those skilled in this art, the cup-point of the invention may be applied to any set screw to which the usual or ordinary cup-point may be applied. It should also be understood that terms and expressions employed herein, except where the context otherwise requires or special definitions may obtain or be given, shall be considered as having meanings conforming generally to the definitions of those terms and expressions as given in the above identified handbook H–28.

In the form of Figs. 1 to 5, inclusive, the outer flank 16 and the inner flank 17 of the cup annulus lie at an acute angle of 60° to one another, make equal angles with thread axis x—x and merge in a reasonably sharp edge 18. The degree of sharpness of edge 18 may be that of or comparable to the sharpness of cup-point biting or setting edges of ordinary cup-point set screws. The outer flank 16 terminates circumferentially at a base line 19 formed by the intersection of the flank with a circumferentially extending surface or chamfer 20 which in the illustrations hereof makes an angle of approximately 35° with a plane normal to the screw or thread axis x—x, as will be noted in Fig. 3. It is preferable that the diameter at the base line 19 be equal to the root or minor diameter of the thread but it may vary slightly therefrom in either direction. The angle of chamfer is not of substantial importance and may be varied over a considerable range although it is deemed preferable that it not substantially exceed 45° to 50° nor be less than 35°. The inner flank 17 similarly terminates at a base line 21 constituting the circumferentially extending junction between the inner flank and a conical surface 22 having a peak angle of about 118° which is the normal or usual surface generated by the ordinary drill point by which the center recess or cup of the common cup-point screw is formed in common practice. It is immaterial, of course, by what method or means the cup-point otherwise is formed, whether by form tool or other means.

The maximum diameter C of the cup-point edge 18 preferably is the minimum diameter C, specified for cup-point diameters for particular nominal sizes of cup-point set screws as indicated in Table 136, page 215, of the aforesaid handbook, but may vary therefrom up to and including the maximum diameter set in said table. It should be stated here that the reference letters C and D applied in Fig. 3 have the reference significance, respectively, of the same letters employed in the diagrams and Table 136 on page 215 of the handbook mentioned.

The height or length to which the cup-point edge 18 extends beyond the set screw thread end is designated A in Fig. 3 and, preferably and in most cases, will be equal to ½ (the thread root diameter minus diameter C) times the natural tangent of the angle between the flanks 16—17. For example, if the set screw nominal size is ¼" x 20, American National or U. S. standard thread and the angle between the flanks of the cup-point is to be 60° with a cup diameter of 0.118 inch, then since the thread root diameter will be 0.187 inch (see Class 1, maximum minor diameters, Table 16, page 47 of said handbook), one may substitute fixed values in the above formula as follows:

$$A = \frac{1}{2} \ (187'' - 0.118'') \ (1.732)$$
$$A = \frac{1}{2} \ (0.069'' \times 1.732) \text{ or}$$
$$A = 0.59''$$

If a cup-point set screw having a cup-point constructed as described and of a size that would normally and properly be employed for the purpose, taking into consideration the shaft size and character, is set against a cylindrical shaft with its axis in line with a radius of the shaft and with the same force that would be employed to "set" an ordinary cup-point set screw of the comparable size and specifications, the cup-point of the screw of this invention may be expected to make or impress a complete or a substantially complete circular (in plan) groove in the shaft as indicated in Fig. 6b when the ordinary cup-pointed set screw has merely impressed a pair of crescent shaped grooves in the shaft surface as shown in Fig. 6c.

The relatively sharp point and angle of the cup-point of the invention when driven against the cylindrical shaft of cold rolled steel normally will effect upward displacement of the metal to each side of the groove cut or formed by the cup-point. In Fig. 6a the shaft S is represented as having had metal displaced upwardly to each side at each of places 23 and 23' which represent those places spaced longitudinally of the shaft where diametrically opposite portions of the cup-point of the set screw 11 threaded into a collar SC about shaft S, have been forced into the shaft metal after the manner indicated in Fig. 5. In Fig. 6b, 24 and 24' designate those portions of the circular impression effected by the cup-point along each side of the shaft in circumferential directions from a line parallel to the shaft axis between the longitudinal groove portions 23, 23', when the set screw 11 is set against the shaft as indicated in Fig. 4.

Of course theoretically, the greater the depth to which the cup-point annulus is imbedded in the work piece, i. e. the shaft S for example, and the greater the proportion of the circumferential length of the cup-point that is imbedded in or frictionally engaged with the work piece, the greater will be the resistance of the set screw to forces tending to effect relative movement between it and the work piece. As more and more of the circumferential length of the cup-point annulus bites into a shaft from places 23, 23' toward places 24, 24', and the greater the depth of bite or displacement of metal, the greater the frictions and the greater the amount of metal that will be placed in shear resistance to relative movement. Sample set screws of several different sizes, some with cup-points of the usual and ordinary form and others with cup-points constructed in accordance with the preferred form of the invention as above described, have been tested under comparable conditions with results overwhelmingly favoring the cup-point of the invention.

TEST DATA

*Holding power or torque resistance of set screw hereinabove described relative to holding power or torque resistance of standard cup-point set screws (both socket type)*

| Comparison Number | Set Screw Size—Nominal "D" Number threads per inch & screw length | Class 1 Maximum Thread Root Diameter | Cup Diameter | Cup Height "A" | Setting Torque in Pounds | Release Torque (initial) in Pounds | Shaft Torque at point of movement in Pounds | Percent Increase of Resistance to Shaft Torque Over Standard | Equipment Used in Tests: 1" x 2" x ¾" bore tapped steel collar, torque wrenches, ¾" Dia. Steel C. R. Shaft. Remarks |
|---|---|---|---|---|---|---|---|---|---|
| 1 | ¼" x 20 x 7/16" cup-pt. S. S. S.[1] | 0.187 | 0.118 | Standard | 50 inch | 26 inch | 200 inch | | Crescent impressions. |
|   | ¼" x 20 x 7/16" 60° cup flanks | 0.187 | 0.118 | 0.059 | 50 inch | 38 inch | 250 inch | 25 | Full circle impression. |
| 2 | ¼" x 28 x ⅜" cup-pt. S. S. S.[1] | 0.205 | 0.118 | Standard | 50 inch | 38 inch | 160 inch | | Crescent impressions. |
|   | ¼" x 23 x ⅜" 60° cup flanks | 0.205 | 0.118 | 0.059 | 50 inch | 38 inch | 250 inch | 56+ | Full circle impression. |
| 3 | 5/16" x 18 x ⅜" cup-pt. S. S. S.[1] | 0.242 | 0.156 | Standard | 150 inch | 90 inch | 45 foot | | Crescent impressions. |
|   | 5/16" x 18 x ⅜" 60° cup flanks | 0.242 | 0.156 | 0.075 | 150 inch | 105 inch | 60 foot | 33⅓ | Full circle impression. |
| 4 | ⅜" x 24 x ⅜" cup-pt. S. S. S.[1] | 0.260 | 0.156 | Standard | 150 inch | 120 inch | 40 foot | | Crescent impressions. |
|   | ⅜" x 24 x ⅜" 60° cup flanks | 0.260 | 0.156 | 0.075 | 150 inch | 115 inch | 60 foot | 50 | Full circle impression. |
| 5 | ½" x 13 x ½" cup-pt. S. S. S.[1] | 0.403 | 0.270 | Standard | 50 foot | 35 foot | 105 foot | | Crescent impressions. |
|   | ½" x 13 x ½" 60° cup flanks | 0.403 | 0.270 | 0.114 | 50 foot | 35 foot | 120 foot | 14+ | Full circle impression. |
| 6 | ½" x 20 x ½" cup-pt S. S. S.[1] | 0.437 | 0.270 | Standard | 50 foot | 37½ foot | 90 foot | | Crescent impressions. |
|   | ½" x 20 x ½" 60° cup flanks | 0.437 | 0.270 | 0.114 | 50 foot | 35 foot | 132½ foot | 46+ | Full circle impression. |
| 7 | ⅝" x 11 x ⅝" cup-pt. S. S. S.[1] | 0.511 | 0.347 | Standard | 80 foot | 52 foot | 135 foot | | Crescent impressions. |
|   | ⅝" x 11 x ⅝" 60° cup flanks | 0.511 | 0.347 | 0.142 | 80 foot | 55 foot | 150 foot | 11+ | Full circle impression. |
| 8 | ⅝" x 18 x ⅝" cup-pt. S. S. S.[1] | 0.555 | 0.347 | Standard | 80 foot | 60 foot | 180 foot | | Crescent impressions. |
|   | ⅝" x 18 x ⅝" 60° cup flanks | 0.555 | 0.347 | 0.177 | 80 foot | 60 foot | 197 foot | 9+ | Full circle impression. |

[1] Standard set screw.

The foregoing data on such comparative tests and the results obtained may be considered as indicative of the advantages of the cup-point of the invention over standard cup-point set screws. As will be noted from such test data, comparative advantage of the screws equipped with cup-points constructed after the teachings of the invention over screws equipped with a standard type of cup-point, ran from a minimum of approximately 10% to over 50% in effecting resistance to relative rotation between the test shaft and collar. In a number of cases the torque force required to effect initial release of the set screw from the shaft was substantially greater than that required for release of the ordinary cup-pointed set screws.

While the preferred angle between the cup-point flanks is 60°, set screws with cup-points having angles between flanks ranging from about 45° to 65° or 70° give quite satisfactory results and may be employed. Ordinarily, when the angle is less than 45° the effectiveness of the sharpness of the point is offset by weakness of the narrowed section and when the angle runs upward of about 70° the penetration and effectiveness drop off rapidly. The preferred embodiment also requires the bisector of the angle between the inner and outer flanks of the cup-point to extend parallel to the axis $x$—$x$ of the thread as shown in Figs. 1 to 5, inclusive, but this relationship may be varied within a range extending to about 10° to either side of parallelism of the angle bisector with the thread axis so long as the cup diameter C is maintained within the stated range. Fig. 7 indicates, diagrammatically, the cup-point profiles as varied from a position $p, p$ where the bisector $y$—$y$ of the angle between the cup-point flanks is parallel to the thread axis $x$—$x$, to a position $p', p'$ where the bisector $y'$—$y'$ is inclined 10° in one direction to the axis $x$—$x$, and to a position $p'', p''$ where the bisector $y''$—$y''$ is inclined 10° in the opposite direction.

In view of the foregoing it is desired that the invention be considered to be limited only by its spirit and the terms of the following claims.

I claim:

1. In a set screw having a solid body portion with a cup-point at one end and an American National Standard thread about the body and wherein the cup annulus has an outer flank and an inner flank converging toward one another away from the thread and terminating at one end of each in a relatively sharp work-engaging edge at the juncture of said ends, said edge being substantially concentric with the thread axis of the screw and the other end of the outer flank terminating substantially at the root of the thread and having a diameter substantially equal to the standard root diameter of the thread for the particular screw number or nominal size, those improvements wherein the maximum diameter of the cup at the flank juncture edge is not substantially greater than the minimum diameter specified for such dimension for an American National Standard cup-point set screw of the particular screw number or nominal size, wherein the perpendicular height of the cup-point from its juncture with the thread to the said flank juncture edge as measured parallel to te screw axis is substantially equal to one-half of the difference between the thread root diameter of the screw and the said minimum cup diameter multiplied by the natural tangent of the angle included between the cup flanks, and wherein the said angle is substantially 60° and neither flank is at an angle substantially more or less than 30° to the thread axis.

2. In the combination of a shaft, a member to be secured to said shaft against rotation relative thereto, and a set screw having a solid body portion with a cup-point at one end and an American National Standard thread about the body, in threaded engagement with said member within a bore therein extending radially of the shaft axis and having its cup-point engaged with a cylindrical surface portion of the shaft, the cup annulus of the set screw having an outer flank and an inner flank converging toward one another away from the thread and terminating at one end of each in a relatively sharp work-engaging edge at the juncture of said ends, said edge being substantially concentric with the thread axis of the screw and the other end of the outer flank terminating substantially at the root of the thread and having a diameter substantially equal to the standard root diameter of the thread for the particular screw number or nominal size, those improvements wherein the maximum diameter of the cup at the flank juncture edge is not substantially greater than the minimum diameter specified for such dimension for an American National Standard cup-point set screw of the particular screw number or nominal size, wherein the perpendicular height of the cup-point from its juncture with the thread to the said flank juncture edge as measured parallel to the screw axis is substantially equal to one-half of the difference between the thread root diameter of the screw and the said minimum cup diameter multiplied by the natural tangent of the angle included between the cup flanks, wherein the said angle is substantially 60° and neither flank is at an angle substantially more or less than 30° to the thread axis, and wherein the said cup-point edge is embedded about its circumference in said cylindrical surface portion of said shaft.

References Cited in the file of this patent

UNITED STATES PATENTS

| Number | Name | Date |
| --- | --- | --- |
| 400,459 | Ide | Apr. 2, 1889 |
| 1,912,177 | Chandler | May 30, 1933 |
| 2,295,314 | Whitney | Sept. 8, 1942 |
| 2,314,274 | Hallowell | Mar. 16, 1943 |
| 2,549,823 | Kost | Apr. 24, 1951 |

FOREIGN PATENTS

| Number | Country | Date |
| --- | --- | --- |
| 7,415 | Great Britain | Apr. 21, 1900 |
| 570,889 | Great Britain | July 26, 1945 |